United States Patent
Yarkosky (10) Patent No.: US 6,895,218 B2
(45) Date of Patent: May 17, 2005

(54) METHOD FOR IN-BUILDING DISTRIBUTION USING WIRELESS ACCESS TECHNOLOGY

(75) Inventor: Mark Yarkosky, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 135 days.

(21) Appl. No.: 09/975,179

(22) Filed: Oct. 11, 2001

(65) Prior Publication Data

US 2003/0216121 A1 Nov. 20, 2003

(51) Int. Cl.[7] .............................. H04B 7/14; H04B 3/36; H04B 7/15
(52) U.S. Cl. .............................. 455/20; 455/7; 455/11.1; 455/15
(58) Field of Search ........................ 455/7, 11.1, 13.1, 455/14, 15, 16, 19, 20, 21, 22

(56) References Cited

U.S. PATENT DOCUMENTS

| | | | |
|---|---|---|---|
| 4,718,108 A | 1/1988 | Davidson et al. | 455/17 |
| 4,727,590 A | 2/1988 | Kawano et al. | 455/33 |
| 5,133,001 A | 7/1992 | Böhm | 379/58 |
| 5,187,806 A | 2/1993 | Johnson et al. | 455/15 |
| 5,321,736 A | 6/1994 | Beasley | 379/58 |
| 5,404,570 A | 4/1995 | Charas et al. | 455/22 |
| 5,603,080 A | 2/1997 | Källander et al. | 455/14 |
| 5,680,438 A | 10/1997 | Beesley | 379/58 |
| 5,963,846 A | 10/1999 | Kurby | 455/12.1 |
| 5,970,408 A | 10/1999 | Carlsson et al. | 455/439 |
| 5,991,599 A | 11/1999 | Uchikawa | 455/20 |
| 6,014,546 A | 1/2000 | Georges et al. | 455/31 |
| 6,055,411 A | 4/2000 | Ishida et al. | 455/11.1 |
| 6,718,160 B2 * | 4/2004 | Schmutz | 455/11.1 |
| 2002/0159551 A1 * | 10/2002 | Ekvetchavit et al. | 375/350 |
| 2003/0054763 A1 * | 3/2003 | Judd et al. | 455/20 |
| 2003/0104781 A1 * | 6/2003 | Son | 455/22 |

FOREIGN PATENT DOCUMENTS

WO    WO 01/52447 A2    7/2001

OTHER PUBLICATIONS

Weisman, Carl J. *The Essential Guide to RF and Wireless*, Prentice–Hall, Inc., 2000, pp. 192–193.

* cited by examiner

*Primary Examiner*—Vivian Chin
*Assistant Examiner*—Raymond B. Persino (57) ABSTRACT

A propagation relay, attached to an enclosure, receives a wireless signal. The signal is sent from a base station over a downlink frequency. The propagation relay converts the downlink signal and transmits it wirelessly, using a different frequency, to mobile station interface ports located within the enclosure. The mobile station interface ports convert the signal back into one at the downlink frequency and send it, via a wireless link, to mobile stations inside the enclosure. Communication from the mobile stations to the base station occurs in the same manner.

22 Claims, 8 Drawing Sheets

METHOD FOR IN-BUILDING DISTRIBUTION USING WIRELESS ACCESS TECHNOLOGY

BACKGROUND

1. Field of the Invention

The invention relates to the distribution of a wireless signal through an enclosure.

2. Description of Related Art

Cellular wireless is an increasingly popular means of personal communication in the modern world. People are using cellular wireless networks for the exchange of voice and data over cellular telephones, Personal Digital Assistants (PDAs), cellular telephone modems, and other devices. In principle, a user can seek information over the Internet or call anyone over a Public Switched Telephone Network ("PSTN") from any place inside the coverage area of the cellular wireless network.

In a typical cellular wireless network, an area is divided geographically into a number of cells and, in turn, sectors. Each cell contains one or more base stations, which communicate with the mobile stations (such as a cellular telephone, pager, or appropriately equipped computer) within the cell. The base stations in the cells are in turn coupled to a base station controller (BSC), which is then coupled to a telecommunications switch or gateway, such as a mobile switching center (MSC) for instance. The MSC may then be coupled to a telecommunications network such as the PSTN (public switched telephone network) or the Internet.

A base station contains an antenna assembly, amplifier, transceiver and other equipment used to communicate with the mobile stations and the MSC. Each cell is defined by a radio frequency (RF) radiation pattern from its respective base transceiver station (BTS, or "base station") antenna. Typically this RF pattern is different than the pattern used by adjacent cells. When a mobile station is positioned in a cell, the mobile station communicates via the RF air interface with the BTS antenna of the cell. This air interface communication can occur over control and traffic channels as defined by an accepted protocol.

Many wireless telephone users are familiar with the problems associated with trying to use wireless telephones inside buildings, tunnels, or other enclosures. These enclosures substantially attenuate the wireless signals transmitted by the base stations located outside. As a consequence of the attenuation, inside such enclosures service often becomes less reliable, with calls being dropped or signal quality being degraded. Service may even become completely unavailable, with the result that the user is unable to send or receive any calls.

One approach used to overcome these difficulties is to increase the power transmitted by the base station. A disadvantage with this approach, however, is that the increased power can lead to increased interference in adjacent cells. This, in turn, can decrease the capacity of the wireless network. The power increase can also interfere with other wireless devices in use around the base station. The magnitude of the power increase proportionally affects the amount of interference produced by the base station, with a greater power increase causing a greater interference.

Also, this approach would only solve half of the problem. Increasing the signal strength from the base station would allow a mobile unit to receive the base station's signal in areas that highly attenuate that signal. It would not aid the base station in receiving a signal from a mobile station. Cellular service is primarily a bi-directional mode of communication. To establish a connection in common devices like cell phones, the base station sends control signals to the mobile unit, which responds by sending additional information back to the base station. Using the defined two-way communication protocol, a connection is established. Therefore, in order to support bi-directional communication, an increase in the transmission power of the base station would require a corresponding increase in the transmission power of the mobile station.

Another approach is to provide a distributed antenna system in the enclosure. In this approach, a hub is connected, via wired links, to one or more wireless access points in the enclosure. The wired link is typically a coaxial cable, a 10Base-T cable, or a fiber optic cable.

The hub transmits the RF signals from the base station to the wireless access points, via the wired links. The wireless access points, in turn, transmit the RF signals into the enclosure, where they may be received by wireless telephones. Similarly, the wireless access points receive RF transmitted by the wireless telephones and transmit the RF to the hub, via the wired links. The hub, in turn, transmits the RF to the base station. In this way, the wireless coverage area provided by the base station may be extended into the enclosure.

A disadvantage with this approach is that cabling is often difficult and expensive to install. This is especially true in buildings and underground areas where cabling may have to be installed inside walls or in other difficult to access areas.

Another disadvantage with this approach is its inflexibility resulting from the use of dedicated wired connections. A wired network is not easy to reconfigure, as additional cabling must be installed.

SUMMARY

A propagation relay proximally located to an enclosure receives downlink signals transmitted by a base station. It converts them to intermediate downlink signals and transmits them over an air interface to mobile station interface ports within the enclosure. The mobile station interface ports receive the intermediate downlink signals, convert them back to the original downlink signals, and then transmit them to be received by mobile stations within the enclosure.

The uplink signals originating from the mobile stations are similarly converted. The mobile station interface ports receive the uplink signals transmitted by the mobile stations operating in the enclosure, convert them into intermediate uplink signals, and transmit the intermediate uplink signals over an air interface to the propagation relay. The propagation relay receives the intermediate uplink signals, converts them back to the original uplink signals, and transmits them to the base station.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

To provide wireless cellular service, geographic areas are divided into cells. Each cell contains at least one base station, which is used to communicate with the mobile stations within the cell. Mobile stations can include any number of wireless devices, but common examples are pagers, cellular telephones, PDA's and wireless modems. Each base station contains one or more antennas, a transmitter and receiver, a power source and other electronics that allow it to communicate with the mobile stations. The base station is also connected to a mobile switching center that ultimately links to the public switched telephone network. In this manner a mobile station user is able to connect to the base station via a wireless link and then access the PSTN through the base station.

The base stations can communicate with the mobile stations through a number of different standards and frequencies. One common wireless standard is the Advanced Mobile Phone Service (AMPS), which employs Frequency-Division Multiple Access (FDMA). AMPS uses a 824–849 MHz transmit band and a 869–894 MHz receive band. Using these bands, an AMPS system can support approximately 830 simultaneous users.

Another common system is North American Digital Cellular (NADC). This system, which is compatible with AMPS and uses the same transmit and receive bands, employs Time-Division Multiple Access. The capacity of this system is roughly six times the capacity of an AMPS system.

In North America, standard IS-95 uses Code-Division Multiple Access. This system also uses the same transmit and receive bands as AMPS and NADC, but additionally it supports transmit and receive bands of 1930–1990 MHz and 1850–1910 MHz respectively.

Europe has its own set of standards for wireless communications, and those often differ from the North America standards. Additionally, many other communications standards have been established but are not in widespread use. These standards, as well as numerous others, all may be used to support communication between a base station and mobile unit.

Figure 1:
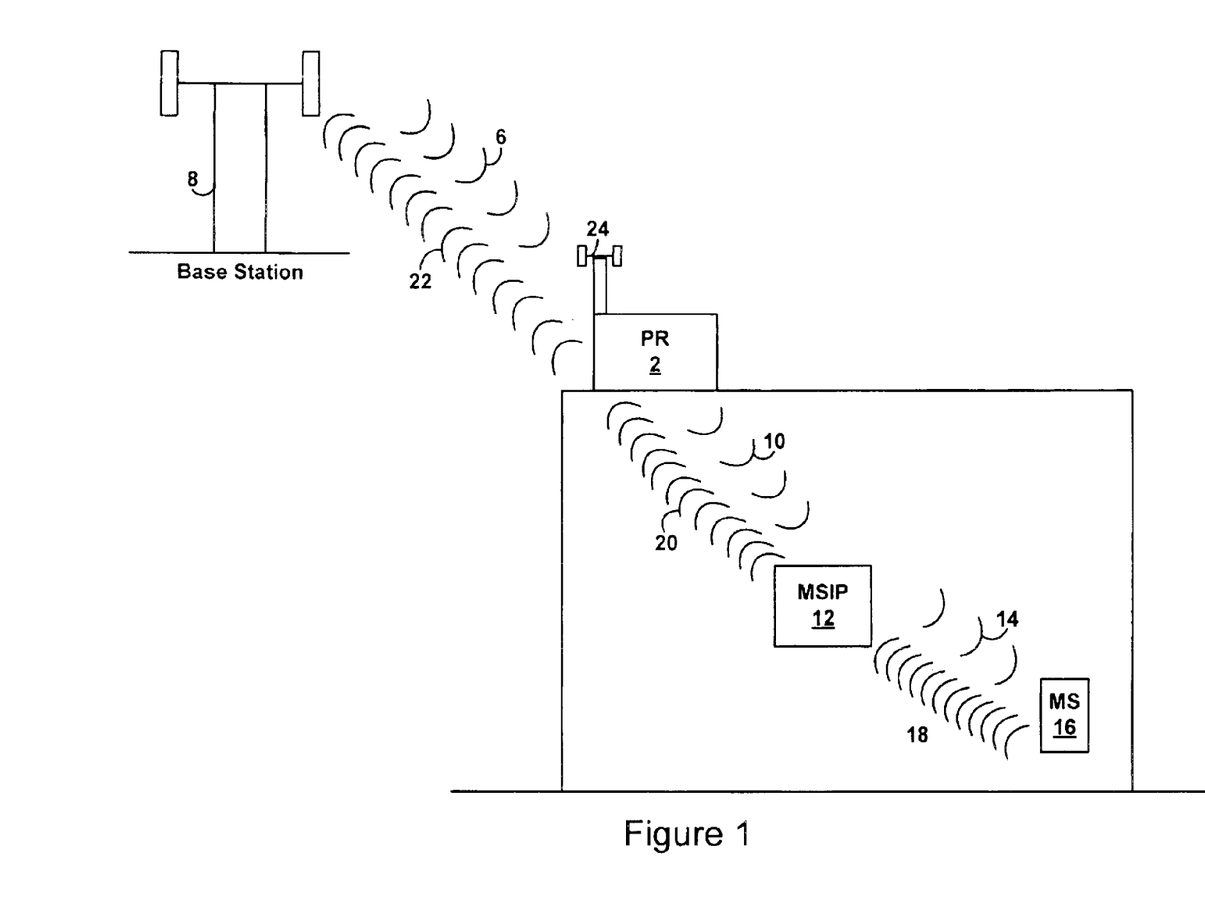
FIG. 1 illustrates an implementation of the system.

Referring to the drawings, FIG. 1 depicts a propagation relay 2 connected to the outside of an enclosure 4. The propagation relay 2 receives a downlink signal 6 transmitted by the base station. The downlink frequency used to transmit the downlink signal 6 can be any of those used in the cellular communications standard employed for that area. It is also possible to use a range of frequencies to transmit the downlink signal 6. In a preferred embodiment, the propagation relay 2 is capable of receiving frequencies from all the cellular communications standards utilized in its reception area.

In another embodiment the propagation relay 2 can receive signals transmitted at frequencies not used in a particular area. If a propagation relay 2 is preprogrammed for a certain standard, not currently in use, then no upgrade to the propagation relay 2 would be required when that standard is employed in the reception area. Additionally, the propagation relay 2 may be moved to other locations in areas using different wireless standards without having to be upgraded. In yet another embodiment the propagation relay 2 may only be capable of communicating according to one or some of the standards utilized in the reception area.

After the propagation relay 2 receives a downlink signal 6 from the base station, it converts it into an intermediate downlink signal 10. The intermediate downlink signal 10 is transmitted at an intermediate downlink frequency over an air interface to the mobile station interface port 12 inside the enclosure.

Figure 2:
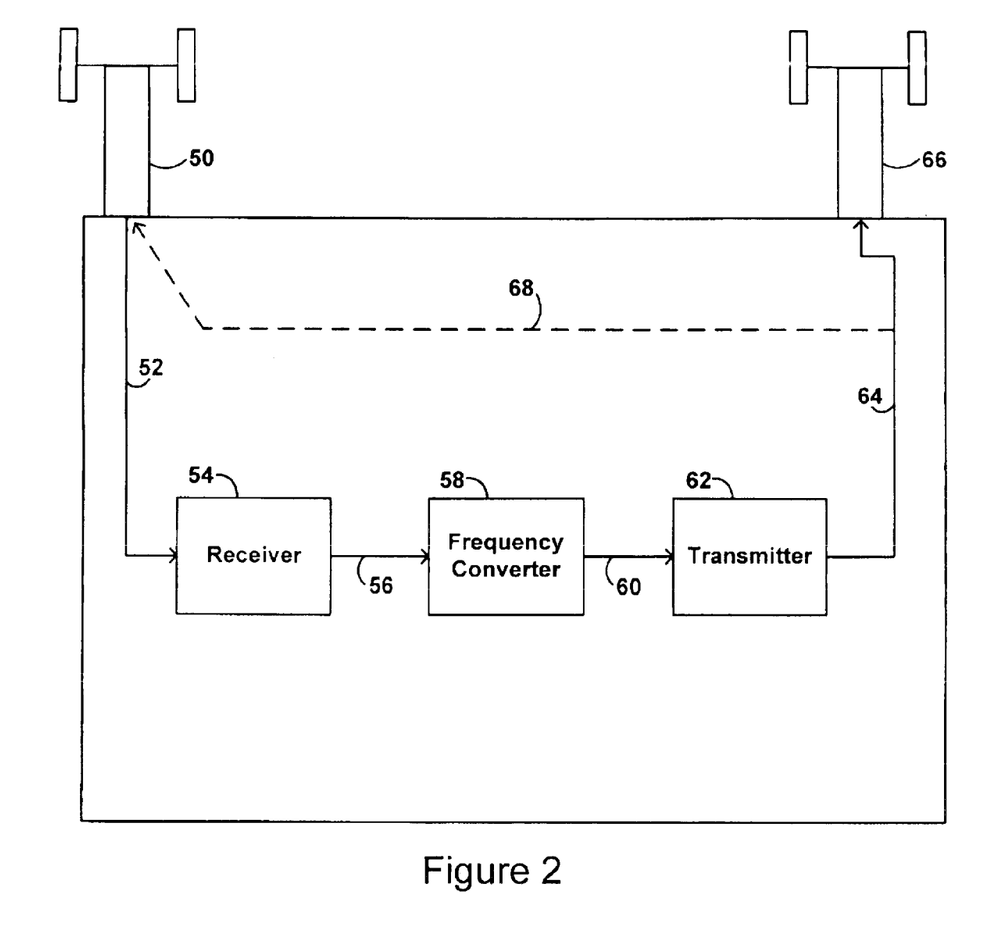
FIG. 2 is a block diagram of a propagation relay.

FIG. 2 shows a block diagram of a propagation relay. A first antenna 50 is attached to the propagation relay and is used to receive downlink signals from the base station. The antenna may also receive various other signals in addition to the downlink signals, because antennas do not generally receive signals only at one specific frequency. After receiving a downlink signal, it is transmitted along a connection 52 to the receiver 54. The receiver 54 extrapolates the downlink signal, according to the known downlink frequencies, from the other various signals received by the antenna. The receiver 54 then sends the downlink signal across connection 56 to the frequency converter 58. The frequency converter 58 converts the downlink signal from the downlink frequency to the intermediate downlink frequency.

The resulting intermediate downlink signal is then sent from the frequency converter 58 along connection 60 to the transmitter 62. The transmitter 62 then sends the intermediate downlink signal to the second antenna 66 via a connection 64 for transmission to the mobile stations. While this configuration uses two antennas 50 and 66, it is possible to use a single antenna for reception and transmission. In a single antenna configuration, the intermediate downlink signal is sent from the transmitter 62 along connections 64 and 68 back to the first antenna 50. The first antenna 50, which also received the downlink signal from the base station, transmits the intermediate downlink signal to the mobile stations.

With further reference to FIG. 1, the mobile station interface port 12 is located inside the enclosure and contains an antenna, a receiver and transmitter, a power source and additional control circuitry for performing the frequency conversions. While, this figure only depicts a single mobile station interface port 12, other implementations may contain multiple mobile station interface ports 12. Once the mobile station interface port 12 receives the intermediate downlink signal 10, it converts it back to the original downlink signal 14 and transmits it to the mobile stations 16. The original downlink signal 14 is transmitted at the same frequency as the downlink signal 6. FIG. 1 only illustrates one mobile station 16 operating within the enclosure 4; however, many mobile stations 16 may be simultaneously used inside the enclosure 4.

Figure 3:
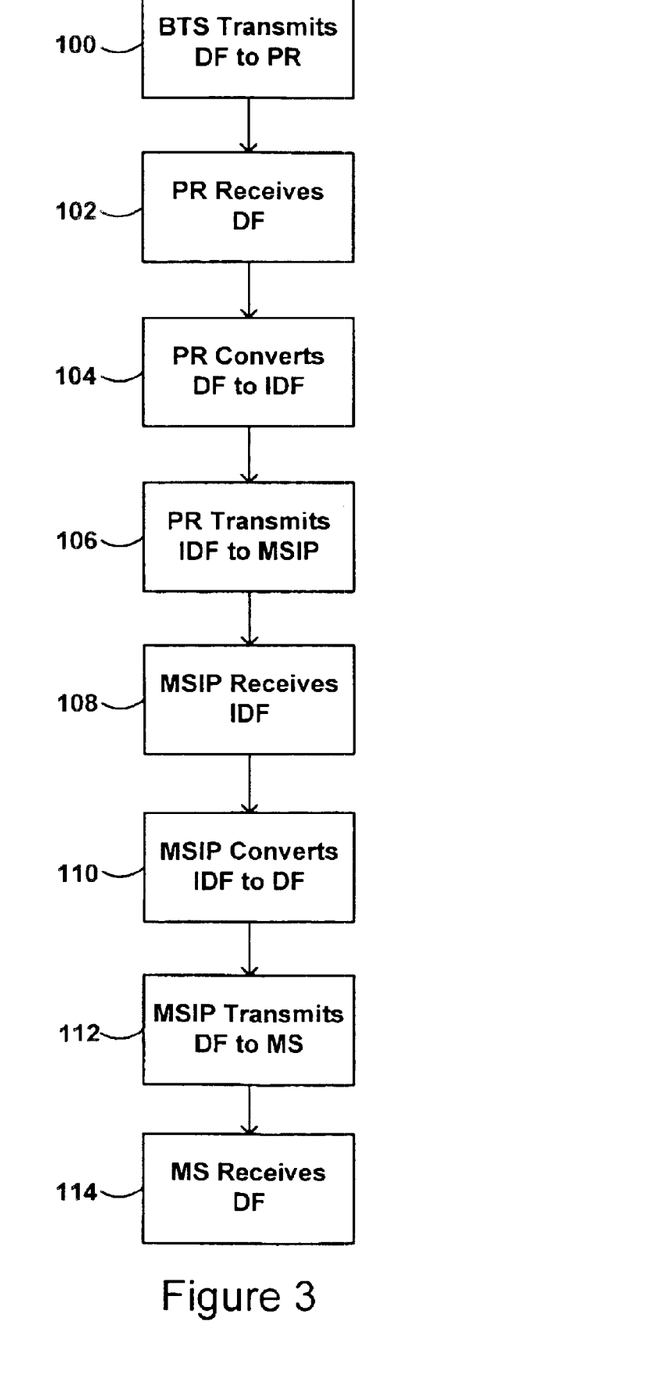
FIG. 3 is a flowchart of transmission from a base station to a mobile station.

FIG. 3 depicts a flow chart of the transmission process from the base station to a mobile station. In the first step, the base station transmits data to the propagation relay (PR) using a downlink frequency (DF) 100. The propagation relay then receives the signal at the downlink frequency 102. Next, the propagation relay converts received signal from the downlink frequency into an intermediate downlink frequency (IDF) 104 and transmits it to the mobile station interface ports (MSIP) 106. The mobile station interface ports receive the signal 108 at the intermediate downlink frequency and convert it back to the original downlink frequency 110. Then the mobile station interface ports transmit the signal at the downlink frequency to the mobile stations (MS) 112. Finally, the mobile stations receive the downlink signal 114.

With further reference to FIG. 1, an uplink signal 18 is similarly converted. The mobile station interface port 12 receives the uplink signal 18 transmitted by the mobile stations 16 operating in the enclosure 4. The uplink signal is transmitted by the mobile station 16 and received by the mobile station interface port 12 at an uplink frequency. The mobile station interface port 12 converts the uplink signal 18 from the uplink frequency into the intermediate uplink frequency. The resulting intermediate uplink signal 20 is then transmitted over the air interface to the propagation relay 2. The propagation relay 2 receives the intermediate uplink signal 20, and it converts it from the intermediate uplink frequency back to the original uplink frequency. The uplink signal 22 is then transmitted to the base station 8.

Figure 4:
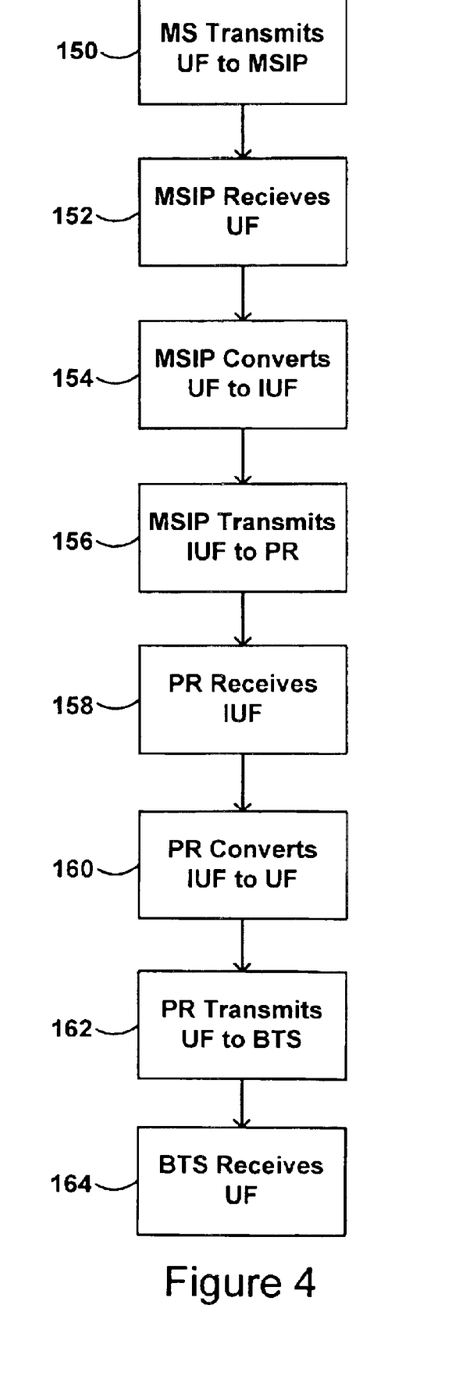
FIG. 4 is a flowchart of transmission from a mobile station to a base station.

The flow chart in FIG. 4 illustrates the process for sending signals from a mobile unit to the base station. First, the mobile station transmits the uplink signal at the uplink frequency (UF) to the mobile station interface port 150. The mobile station interface port receives the uplink signal 152 and converts it to the intermediate uplink frequency (IUF) 154. The intermediate uplink signal is then transmitted to the propagation relay 156 where it is received 158 and converted back to the original uplink frequency 160. Finally, the propagation relay transmits the uplink signal, at the uplink frequency, to the base station 162, where it is ultimately received 164.

Again with reference to FIG. 1, in a preferred embodiment, the intermediate uplink frequency is different from the intermediate downlink frequency. The use of different frequencies prevents interference between the intermediate downlink signal 10 and the intermediate uplink signal 20. It is possible, however, to use the same frequency for both the intermediate uplink and intermediate downlink signals.

With reference to FIG. 2, in one embodiment the propagation relay includes a first antenna 50 located outside of the enclosure for wireless communication with the base station and a second antenna 66 inside the enclosure 4 for wireless communication with the mobile station interface ports. The use of two antennas 50 and 66 on the propagation relay allows signals to be electronically propagated, via the propagation relay's internal circuitry, through the outer walls of structure. This prevents the signal from being attenuated by the structure. The intermediate downlink signal is then sent from the antenna located inside the enclosure. It is also possible, however, that the intermediate downlink signal is transmitted from outside the enclosure. In this case, the signal must travel through the enclosure's walls before reaching the inside.

Referring again to FIG. 1, the mobile station interface port 12 may also have two antennas (not shown). One antenna communicates with the propagation relay 2, and the other communicates with the mobile stations 16 inside the enclosure 4. Alternatively, depending on the frequencies used, a mobile station interface port 12 may be able to use one antenna for wireless communication with both the propagation relay 2 and the mobile stations 16.

In one embodiment, the propagation relay 4 uses an omni-directional antenna. An omni-directional antenna generally radiates equal signals in all directions. This allows the propagation relay to communicate directly with all of the mobile station interface ports in the enclosure. An arrangement where one central propagation relay communicates with all the mobile station interface ports is called a "star" configuration.

Figure 5:
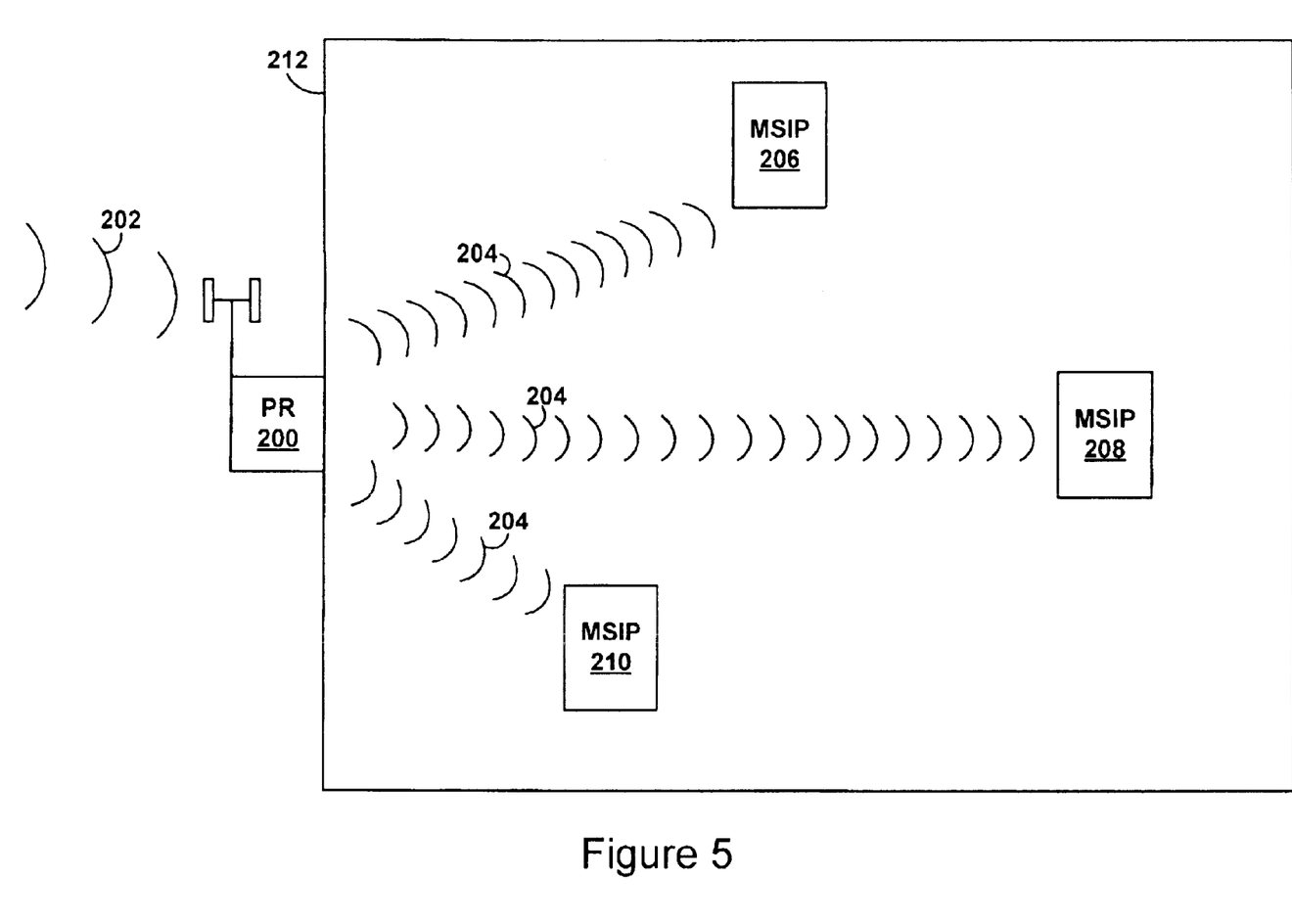
FIG. 5 depicts the propagation relay in a star configuration.

FIG. 5 shows the system in a "star" configuration. The propagation relay 200 receives a downlink signal 202 at the downlink frequency and converts it into an intermediate downlink signal. This signal 204 is then transmitted at the intermediate downlink frequency to the mobile station interface ports 206, 208, 210. Using this configuration, a single propagation relay 200 transmits to mobile station interface ports 206, 208, 210 that are located in a non-linear configuration with respect to the propagation relay 200, thus achieving the star configuration. While this figure only depicts communication from the propagation relay 200, transmission from the mobile station interface points occurs in the same manner. The three mobile station interface ports 206, 208, 210 send their intermediate uplink signals, via the intermediate uplink frequency, to the propagation relay 200. The signals are then converted into the uplink frequency and sent to the base station.

Another embodiment uses a directional antenna. In contrast to an omni-directional antenna, a directional antenna primarily propagates signals in only one direction. This approach may be useful in a long, narrow structure, such as a tunnel, where the signals mostly travel along a straight path.

In a preferred embodiment, the intermediate frequencies are chosen so as to provide good coverage throughout the enclosure. The intermediate frequencies may be in one of the Industrial/Scientific/Medical (ISM) bands. The ISM frequency bands include 40.66–40.70 MHz, 902–928 MHz (UHF), 2.40–2.50 GHz (S-band) and 5.725–5.875 GHz (C-band). The frequencies in these ISM bands are preferred, because they may be used for a variety of applications without a license from the Federal Communications Commission (FCC). Other embodiments may use frequencies at approximately 120 MHz and 400 MHz, which also propagate well through buildings.

Typically, the lower frequencies are also preferred, because they propagate well in typical buildings. Buildings and other structures tend to attenuate higher frequency signals more than lower frequency signals. Therefore, it is generally advantageous to down convert the downlink signal before transmitting it through the enclosure. It is possible, however, to up convert the downlink signal.

In another embodiment, the intermediate frequencies may be chosen from an available range of frequencies, depending on which provides the best reception at any time. Obstructions between the propagation relay and a mobile station interface port may impede the propagation of signals on a particular frequency. Different paths to the propagation relay may cause the optimal frequencies for transmission to change. This would be the case, for instance, if the mobile station access point were relocated inside the enclosure. Also, other transmissions using nearby frequencies may cause interference on a certain channel, or they may be transmitting on that channel.

These effects may be countered by allowing the propagation relay and the mobile station interface ports to communicate with each other over a variable range of frequencies. The propagation relay and the mobile station interface ports vary the intermediate downlink and intermediate uplink frequencies based on which frequencies provide the best signal quality. The intermediate downlink and uplink frequencies may be established before a connection is made between the base station and a mobile unit, or it may vary during an established connection.

Figure 6:
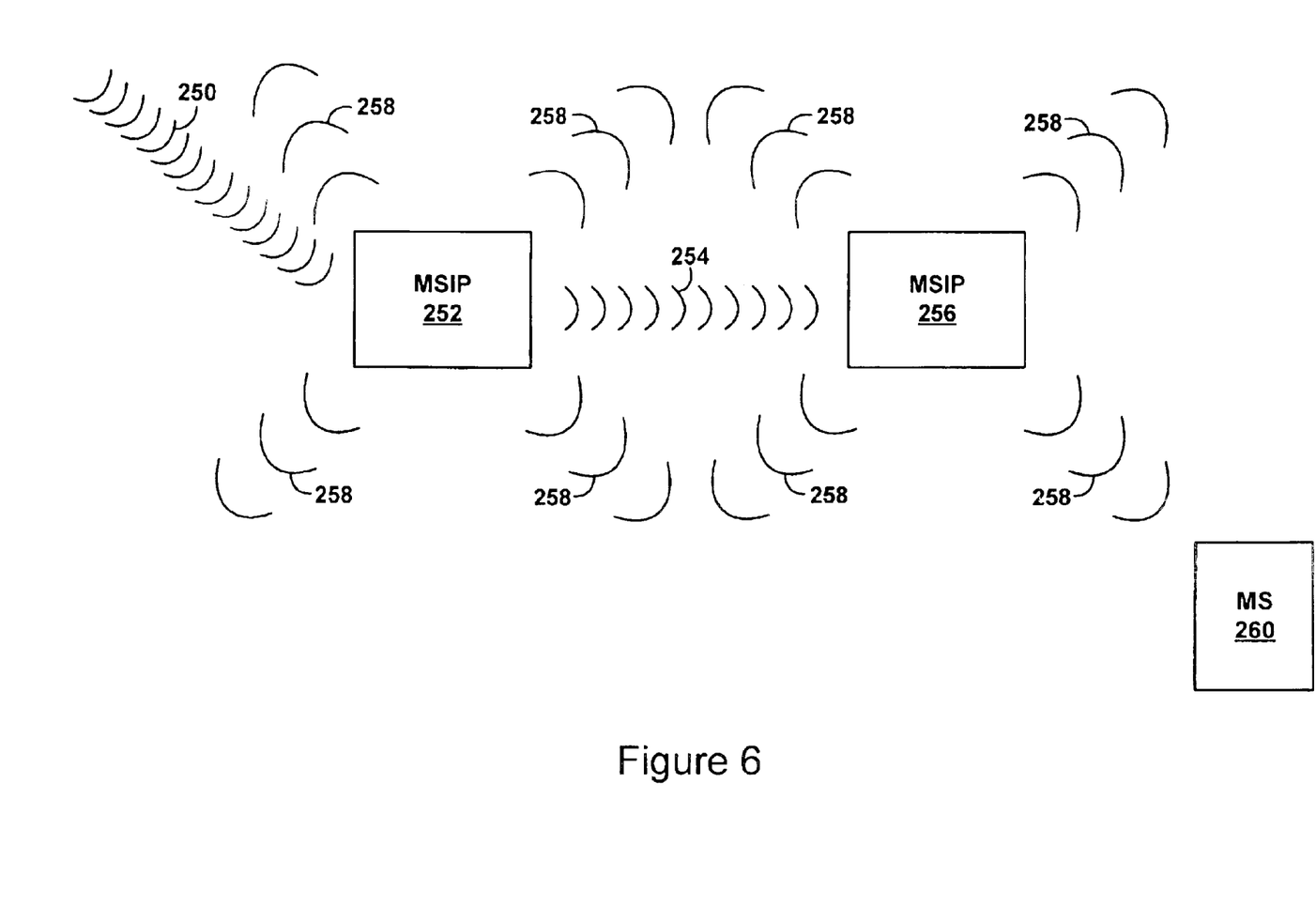
FIG. 6 shows one mobile station interface port retransmitting the intermediate downlink signal to another mobile station interface port.

Mobile station interface ports may also be able to rebroadcast intermediate frequencies to each other. This may be helpful for providing good wireless coverage in long enclosures, such as tunnels, where the intermediate downlink and uplink signals must be propagated over a long distance. FIG. 6 shows one mobile station interface port rebroadcasting to another mobile station interface port. The first mobile station interface port 252 receives the intermediate downlink signal 250 from the propagation relay (not shown) and retransmits the intermediate downlink signal 254 to another mobile station interface port 256. The intermediate downlink signal is transmitted at the intermediate downlink frequency, and this configuration extends the distance covered by the intermediate downlink signal. The first mobile station interface port 252 may also receive its signal from another source, such as repeater or from another mobile station interface port. Also shown are the original downlink signals 258 transmitted from the mobile station interface ports 252, 256 to the mobile stations 260.

While this figure only depicts transmission of the downlink and intermediate downlink signals, transmission from the mobile station to the base station occurs in a similar manner. The mobile station 260 transmits the uplink signal to the mobile station interface port 256, which then sends the intermediate uplink signal to a second mobile station interface port 252. The second mobile station interface port 252 sends the intermediate uplink signal to the propagation relay.

Another embodiment uses multiple propagation relays. Multiple propagation relays provide more than once access point into the enclosure. This use of multiple access points reduces the distance that the intermediate downlink and uplink signals must travel between a propagation relay and a mobile station interface port. This implementation is especially useful in large structures or long, narrow enclosures where the distance between a single propagation relay and a mobile station interface port furthest from the propagation relay would be large.

Figure 7:
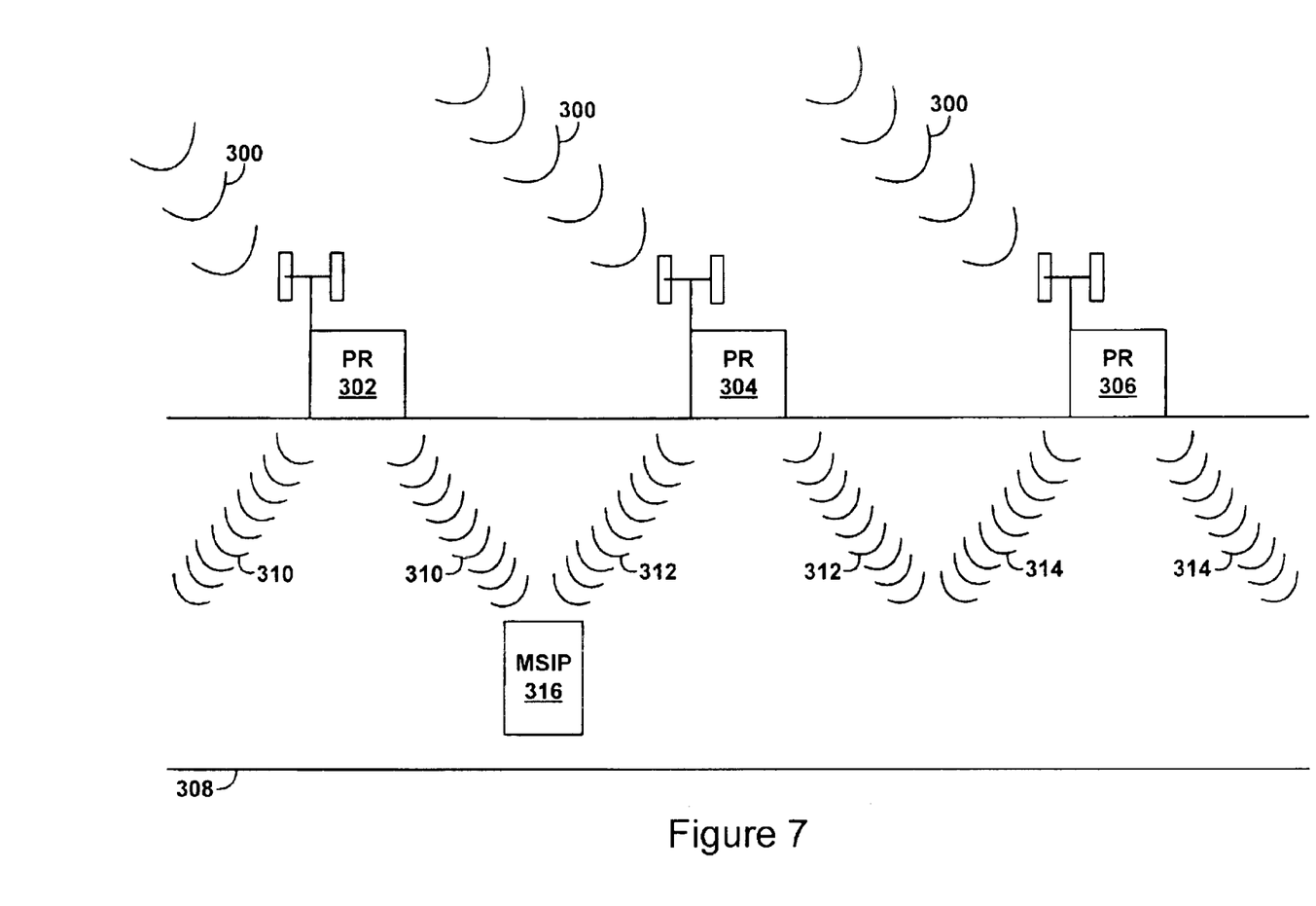
FIG. 7 illustrates an implementation using multiple propagation relays.

FIG. 7 depicts an implementation using multiple propagation relays. In this figure, propagation relays 302, 304 and 306 are each connected to the enclosure 308. The propagation relays 302, 304 and 306 independently receive the downlink signals 300, convert them into the intermediate downlink signals 310, 312 and 314 and transmit the intermediate downlink signals 310, 312 and 314 at the intermediate downlink frequency to the mobile station interface port 316. Each propagation relay 302, 304 and 306 creates its own intermediate downlink signal 310, 312 and 314. Propagation relay 302 produces an intermediate downlink signal 310; propagation relay 304 produces an intermediate downlink signal 312; and propagation relay 306 produces an intermediate downlink signal 314.

Communication of the uplink and intermediate uplink signals occurs in a similar manner. The mobile station interface port 316 receives an uplink signal from a mobile station, converts it into an intermediate uplink signal and sends to the propagation relays 302, 304 and 306. One or more of the propagation relays 302, 304 and 306 may receive the intermediate uplink signal, convert it into the uplink signal and send it to the base station.

Figure 8:
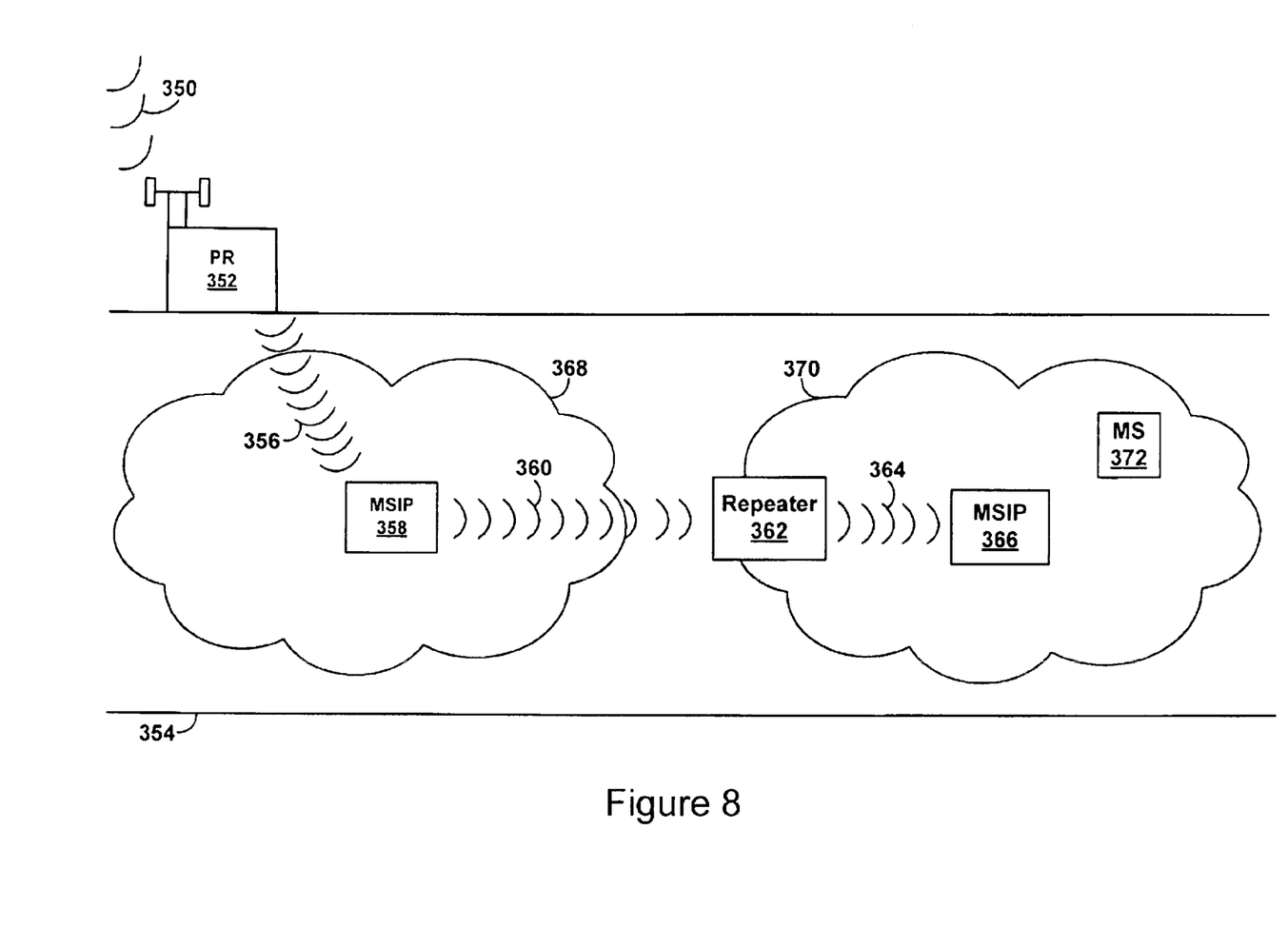
FIG. 8 depicts a configuration using repeaters.

In another embodiment, repeaters are used to increase the propagation distance of the intermediate downlink and uplink signals. FIG. 8 illustrates an embodiment using a repeater to extend the distance of the intermediate downlink signals. A propagation relay 352 attached to the enclosure 354 receives the downlink signal 350 transmitted by the base station. The downlink signal 350 is transmitted at the downlink frequency. The propagation relay 352 converts the downlink signal into an intermediate downlink signal 356, which is transmitted to a mobile station interface port 358 at the intermediate downlink frequency. The mobile station interface port 358 retransmits the intermediate downlink signal 360 to a repeater 362. The repeater 362 receives the intermediate downlink signal 360 and retransmits the intermediate downlink signal 364 to a second mobile station interface port 366.

In another embodiment the repeater uses a third frequency, different from the downlink and intermediate downlink frequencies, to transmit to the mobile station interface port. This implementation would require that the mobile station interface port be capable of receiving signals from the repeater at the third frequency.

Communication from the mobile station 372 to the base station would occur in a similar manner. The uplink signal would be sent from the mobile station 372 to a first mobile station interface port 366. That mobile station interface port 366 would convert the signal to the intermediate uplink signal and send the signal through a repeater 362 to a second mobile station interface port 358. The second mobile station interface port 358 then sends the signal to the propagation relay 352 where it is converted into the uplink signal and sent to the base station. In another embodiment it is possible to use a different repeater (not shown) for propagating the intermediate uplink signal than the repeater 362 for the intermediate downlink signal 360, 364.

Each mobile station interface port 358 and 366 converts the intermediate downlink signal it receives 356 and 364 into the downlink frequency. The downlink signal is then transmitted from the mobile station interface ports 358 and 366 to the mobile stations 372. The figure illustrates the approximate distances covered by the mobile station interface ports 358 and 366.

The first mobile station interface port 358 transmits the downlink signal over a range approximately depicted by 368. Likewise, the second mobile station interface port 366 transmits the downlink signal over a distance approximately indicated by 370. The use of the repeater 362 allows an increase in the range covered by the system without significantly overlapping the coverage areas of the first mobile station interface port 358 and the second mobile station interface port 366. This is preferred because it minimizes the number of mobile station interface ports 358 and 366 required in the system while maximizing the coverage area.

One skilled in the art will recognize that modifications and combinations of the previously discussed embodiments are possible. For instance, a system that implements mobile station access points relaying the intermediate downlink signals to other mobile access points may be combined with one that uses repeaters. As another example, a configuration may be implemented that uses both multiple propagation relays and repeaters. Other embodiments are also possible.

In preferred embodiments, the present invention provides a number of advantages. For example, wireless coverage in buildings and other enclosures may be provided more quickly and easily because the need for extensive cabling is avoided.

In addition, the present invention allows for filtering of the signals to improve carrier to interference (C/I) ratios. The C/I ratio is the ratio of the carrier signal to the combined interference due to adjacent and co-channel interference.

Improving this ratio means the carrier signal is stronger compared to the interference, and thus the signal quality is higher.

The filtering may be performed at any number of locations within the system. The signal may be filtered at the propagation relay, before it is converted into the intermediate downlink frequency. It may also be filtered after it is converted but before it is transmitted to the mobile station interface ports. Likewise, the mobile station interface ports may filter the signal before or after it is converted back to the downlink frequency. Filtering may also be performed at the antennas. This may be done, for example, by using smart antennas. It is also possible to filter the signal at multiple points within the system, for example, at both the propagation relay and the mobile station access points.

An exemplary embodiment of the present invention has been described above. Those skilled in the art will understand, however, that changes and modifications may be made to this embodiment without departing from the true scope and spirit of the present invention, which is defined by the claims.

I claim:

1. A propagation system for extending into an enclosure a wireless coverage area provided by a base station located outside of the enclosure, the propagation system comprising:
   an integrated propagation relay, the integrated propagation relay including at least one antenna for transmitting to and receiving from the base station wireless signals in a first set of frequencies, and for transmitting into and receiving from inside of the enclosure wireless signals in a second set of frequencies, and a frequency converter for converting between the first set of frequencies and the second set of frequencies, wherein the at least one antenna and the frequency converter are located within a single housing; and
   a first mobile station interface port located in the enclosure, the first mobile station interface port including at least one antenna for transmitting and receiving wireless signals in the first set of frequencies and for transmitting and receiving directly with the integrated propagation relay wireless signals in the second set of frequencies, the first mobile station interface port including a frequency converter for converting between the first set of frequencies and the second set of frequencies.

2. The propagation system of claim 1, wherein the integrated propagation relay includes a first antenna for transmitting and receiving wireless signals in the first set of frequencies and a second antenna for transmitting and receiving wireless signals in the second set of frequencies.

3. The propagation system of claim 1, wherein the at least one mobile station interface port includes a first antenna for transmitting and receiving wireless signals in the first set of frequencies and a second antenna for transmitting and receiving wireless signals in the second set of frequencies.

4. The propagation system of claim 1 further comprising:
   a repeater for receiving wireless signals from the integrated propagation relay in the second set of frequencies and for transmitting the wireless signals in the second set of frequencies to another repeater or to a mobile station interface port other than the first mobile station interface port.

5. The propagation system of claim 1 further comprising:
   a repeater for receiving wireless signals in the second set of frequencies from another repeater or a mobile station interface port other than the first mobile station interface port and for transmitting the wireless signals in the second set of frequencies to the integrated propagation relay.

6. The propagation system of claim 1, further including a plurality of mobile station interface ports located in the enclosure, each one of the plurality of mobile station interface ports including at least one antenna for transmitting and receiving wireless signals in the first set of frequencies and in the second set of frequencies and further including a frequency converter for converting between the first set of frequencies and the second set of frequencies.

7. The propagation system of claim 6, wherein each one of the plurality of mobile station interface ports is located in the enclosure, and wherein at least one of the plurality of mobile station interface ports transmits directly to the propagation relay and receives directly from the integrated propagation relay wireless signals in the second set of frequencies.

8. The propagation system of claim 7 further comprising:
   at least one mobile station, wherein the at least one mobile station is capable of communicating with at least one of the plurality of mobile station interface ports in the first set of frequencies.

9. The propagation system of claim 1, further comprising:
   a repeater for receiving wireless signals in the second set of frequencies, for converting the wireless signals in the second set of frequencies to wireless signals in a third set of frequencies, and for transmitting the wireless signals in the third set of frequencies to another repeater or to a mobile station interface port other than the first mobile station interface port.

10. The propagation system of claim 1, wherein the integrated propagation relay comprises a filtering subsystem for filtering wireless signals in the first set of wireless frequencies or for filtering wireless signals in the second set of frequencies to improve a carrier to interference ratio.

11. The propagation system of claim 1, wherein the first mobile station interface port comprises a filtering subsystem for filtering wireless signals in the first set of wireless frequencies or for filtering wireless signals in the second set of frequencies to improve a carrier to interference ratio.

12. The propagation system of claim 1, wherein the integrated propagation relay includes a frequency negotiation subsystem for negotiating with the propagation relay to determine which frequencies in the second set of frequencies provide approximately a best reception between the integrated propagation relay and the first mobile station interface port.

13. The propagation system of claim 1, wherein the first mobile station interface port includes a frequency negotiation subsystem for negotiating with the integrated propagation relay to determine which frequencies in the second set of frequencies provide approximately a best reception between the integrated propagation relay and the first mobile station interface port.

14. A propagation system for providing wireless communications between at least one mobile station located in an enclosure and a base station located outside of the enclosure, the base station transmitting wireless signals at a first downlink frequency and receiving wireless signals at a first uplink frequency, the mobile station transmitting wireless signals at the first uplink frequency and receiving wireless signals at the first downlink frequency, the propagation system comprising:
   at least one integrated propagation relay, the at least one integrated propagation relay transmitting within the enclosure at a second downlink frequency wireless signals received from the base station at the first downlink frequency, the at least one integrated propagation relay transmitting to the base station at the first uplink frequency wireless signals received from inside of the enclosure at a second uplink frequency;

wherein the integrated propagation reply comprises a first antenna for transmitting to the base station wireless signals at the first uplink frequency and for receiving from the base station wireless signals at the first downlink frequency, a second antenna for transmitting within the enclosure wireless signals at the second downlink frequency and for receiving from the enclosure wireless signals at the second uplink frequency, and a converter for converting between the first and second downlink frequencies and between the first and second uplink frequencies, and wherein the first antenna, the second antenna and the converter are allocated within a single housing at least one mobile station interface port located in the enclosure, the at least one mobile station interface port transmitting directly to the at least one integrated propagation relay at the second uplink frequency wireless signals received from the at least one mobile station at the first uplink frequency, the at least one mobile station interface port transmitting to the at least one mobile station at the first downlink frequency wireless signals received at the second downlink frequency.

15. The propagation system of claim 14, wherein the at least one mobile station interface port includes:

a first antenna for transmitting to the at least one mobile station wireless signals at the first downlink frequency and for receiving from the mobile station wireless signals at the first uplink frequency; and a second antenna for transmitting wireless signals at the second uplink frequency and for receiving wireless signals at the second downlink frequency.

16. The propagation system of claim 14 wherein the first set of frequencies is within the range of approximately 824 MHz to 1.910 GHz.

17. The propagation system of claim 14 wherein the second set of frequencies is within the range of approximately 40.66 MHz to 2.5 GHz.

18. The propagation system of claim 14, wherein the at least one mobile station interface port includes a plurality of mobile station interface ports located in the enclosure.

19. The propagation system of claim 18, wherein a first mobile station interface port of the plurality of mobile station interface ports is capable of sending to a second mobile station interface port of the plurality of mobile station interface ports at the second downlink frequency and where the second mobile station interface port of the plurality of mobile station interface ports is capable of receiving from the first mobile station interface port of the plurality of mobile station interface ports at the second downlink frequency.

20. The propagation system of claim 18, wherein a first mobile station interface port of the plurality of mobile station interface ports is capable of sending to a second mobile station interface port of the plurality of mobile station interface ports at the second uplink frequency and where the second mobile station interface port of the plurality of mobile station interface ports is capable of receiving from the first mobile station interface port of the plurality of mobile station interface ports at the second uplink frequency.

21. The propagation system of claim 18, wherein each one of the plurality of mobile station interface ports is located in the enclosure, and wherein at least one of the plurality of mobile station interface ports transmits directly to the at least one integrated propagation relay wireless signals at the second uplink frequency and receives directly from the at least one integrated propagation relay wireless signals at the second downlink frequency.

22. The propagation system at claim 14, wherein the at least one integrated propagation relay includes a plurality of integrated propagation relays, and where each one of the plurality of integrated propagation relays is capable of receiving from the base station at the first downlink frequency and sending to the base station at the first uplink frequency, and where each one of the plurality of integrated propagation relays is capable of sending to the at least one mobile station interface port at the second downlink frequency and receiving from the at least one mobile station interface port at the second uplink frequency.

* * * * *